Figure 1:
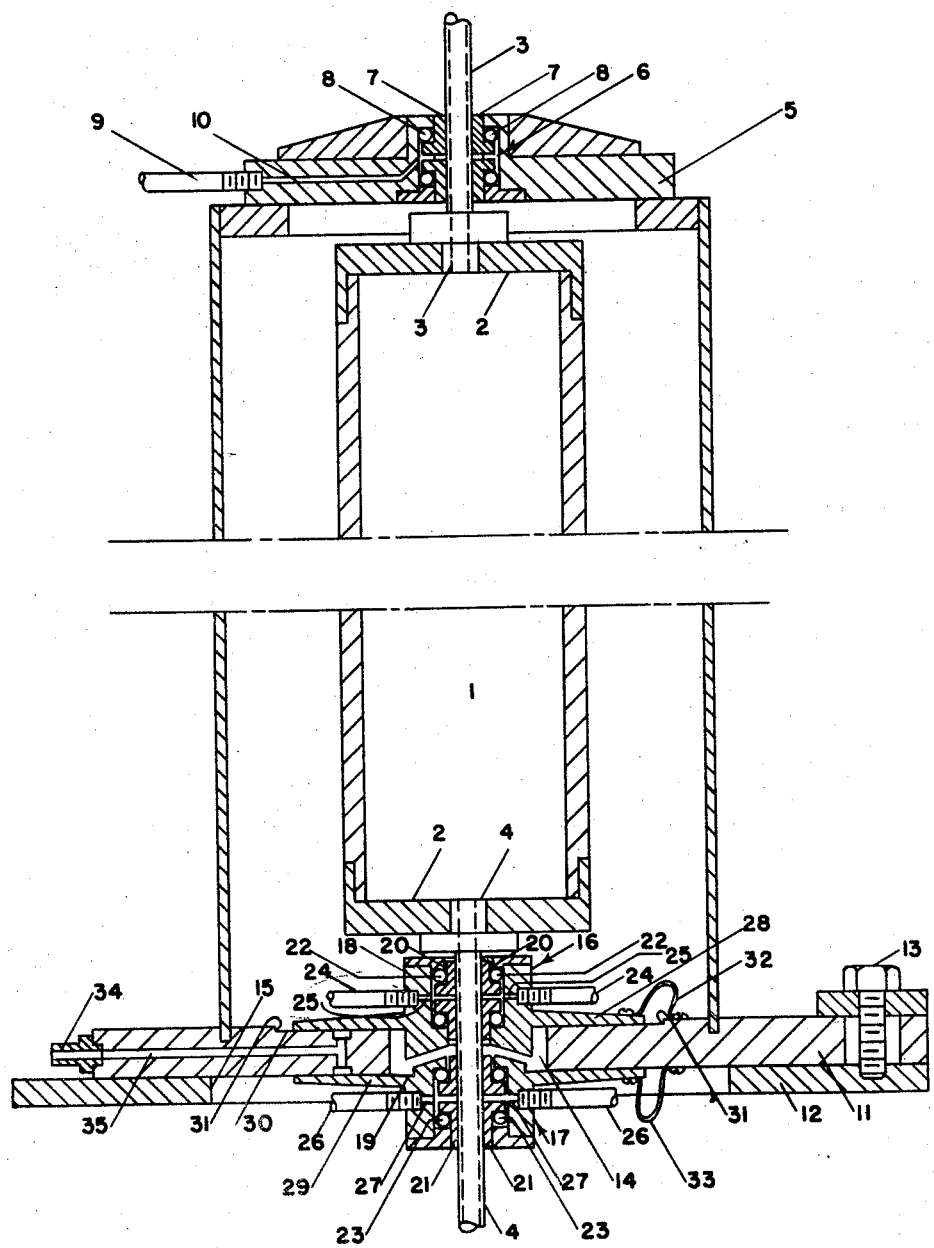

Aug. 9, 1960   J. W. BEAMS ET AL   2,948,572
CENTRIFUGES
Filed March 28, 1944

INVENTORS
J.W. BEAMS
BY- L.B. SNODDY

ATTORNEY

United States Patent Office 2,948,572
Patented Aug. 9, 1960

2,948,572
CENTRIFUGES

Jesse W. Beams and Leland B. Snoddy, Charlottesville, Va., assignors to the United States of America as represented by the United States Atomic Energy Commission Filed Mar. 28, 1944, Ser. No. 528,470

17 Claims. (Cl. 308—143)

This invention relates to power driven centrifuges and like rotating devices, and more particularly to means for damping vibration forces at the critical speeds of rotation of such devices.

In power driven centrifuges and similar devices that rotate at high speeds, there are certain speeds called critical speeds at which the shaft of the device is distorted or flexed out of the axis of rotation and, while rotating in such distorted positions, causes severe vibrating forces to be transmitted to the bearings and supporting structure in which the shaft rotates. In a rotating device, such as a centrifuge, a critical speed occurs where the speed of rotation of the device is such that the number of revolutions in a given unit of time is equal to the number of vibrations in the same time unit that correspond to one of the natural modes of vibration of the rotating member and its supporting structure, and the speeds of rotation at which these critical speeds occur depend for the most part upon the stiffness of the shaft, and the inertia of the stationary and rotating parts of the device.

These severe forces, caused by distortion or deflection of the shaft, produce vibration waves that have a different amplitude and length depending upon the rotational speed of the device. It will be apparent, therefore, that a critical speed, causing severe vibration in the device, will occur at the speed or speeds of rotation at which the nodes of a vibration wave exist simultaneously at the centers of the bearings which support the shaft of the device.

In accordance with the present invention it is proposed to provide a shaft bearing construction for high speed centrifuges and the like that will operate effectively to prevent the occurrence of vibration at the critical speeds of rotation of the device.

With the foregoing premises in mind, the principal object of the invention is to provide a novel vibration damping construction for high speed rotating devices that is constructed and arranged to preclude the existence of vibration nodes simultaneously at the shaft supporting bearings at the critical speed or speeds of rotation of the device.

Another object of the invention is to provide a novel vibration damping bearing construction for the shaft of a high speed rotating device comprising a dual bearing assembly wherein the bearings of such assembly are independently supported for limited movement relative to each other transversely of the axis of the shaft.

A further object of the invention is to provide a novel vibration damping construction as set forth wherein the bearings of the assembly are spaced apart axially of the shaft a distance different from the spacing of the nodes of the vibration waves at critical speeds of the device so that nodes of such waves cannot exist simultaneously at both bearings and thereby render them ineffective in damping.

These and other objects of the invention, and the various features and details of the construction and operation thereof, are hereinafter fully set forth and described, and shown in the accompanying drawing in which the figure is a sectional view taken vertically through a centrifuge having a shaft bearing assembly embodying the present invention.

Referring now to the drawing, the present invention is illustrated in conjunction with a centrifuge or like device comprising a cylindrical chamber 1 having end caps or walls 2, 2. Secured centrally in these end caps 2 and coaxially of said chamber 1 are upper and lower shafts 3 and 4, respectively, which rotatably support the chamber as the device is rotationally driven by power applied, for example, to the upper shaft 3 from an electric motor, turbine or other suitable source (not shown). The shafts 3 and 4 preferably are hollow or tubular in order that materials to be treated, and that have been treated, in the centrifuge may be introduced to, and withdrawn from, the chamber 1 through said shafts.

As shown in the drawing, the upper shaft 3 is journalled in a stationary, rigid support member 5 by means of a bearing assembly 6. This bearing assembly 6 is fixedly secured with respect to the support 5, and comprises bearings 7 that are generally L shape in cross section and have their flange portions mounted between rings 8 of circular cross section that serve as shock absorbing elements to dampen the least vibrations in the device. For example, the bearings 7 may be lead bronze (20% lead) and the rings 8 may be neoprene. Preferably, the bearing assembly is lubricated by oil or other suitable lubricant supplied thereto through pipe 9 and passage 10.

The lower shaft 4 is supported, in a manner hereinafter set forth, with respect to a stationary, rigid structure that may comprise members 11 and 12, respectively, suitably secured together, for example, by one or more bolts 13. In the illustrated embodiment of the invention, these members 11 and 12 are of annular configuration having aligned openings 14 and 15, respectively, therethrough of a diameter sufficiently large to provide clearance for lateral movement therewithin of a pair of journal bearings 16 and 17 that are independent of each other and support the lower shaft 4 with respect to the stationary supporting members 11 and 12.

The bearing assemblies 16 and 17 are generally similar in construction to the bearing assembly 6 previously described, and comprise bearing housing members 18 and 19, respectively, within which are contained bearings 20 and 21 of generally L cross-section shape having their flange portions mounted between rings 22 and 23 that are circular in cross section and operate effectively to absorb the shock of lesser vibrations in the device. In these assemblies 16 and 17, the bearings 20 and 21 may be lead bronze (20% lead) and the rings 22 and 23 may be neoprene, and satisfactory results have been obtained by the use of these materials. The bearings preferably are lubricated by a suitable lubricant supplied thereto through pipes 24 and passages 25 in the case of the bearing assembly 16, and through pipes 26 and passages 27 in the case of bearing assembly 17.

A particular feature of the present invention resides in the manner and construction by which the bearing assemblies 16 and 17 are supported with respect to the stationary supporting members 11 and 12, and, referring to the drawing, it will be observed that there is formed integral with each bearing housing 18 and 19, and circumferentially thereof, a radially projecting, circumferential flange or disk-like portion, 28 and 29, respectively, that may be of decreasing thickness outwardly as shown.

Considering first the flange or disk portion 28 of the upper bearing assembly 16, it is to be noted that the under surface thereof is flat, and lies in a plane normal to the axis of the shaft 4. This flange 28 rests upon the upper surface of the stationary member 11 with the flat under surface of said flange in contact therewith. The flange 28 is arranged for sliding movement, together with the bearing assembly 16, upon and relative to the stationary member 11 in a direction transverse the axis of the shaft 4. For the purpose of limiting the extent of transverse sliding movement of the bearing assembly 16 and its flange portion 28 with respect to the stationary support member 11, the surface of the latter is provided with a circular slightly recessed plane portion 30, of somewhat larger diameter than said flange portion 28, that forms a circumferential shoulder or stop 31 operable to limit transverse movement of the flange 28, and hence the bearing assembly 16. The radial flange portion 29 of the lower bearing assembly 17 is generally similar in construction and arrangement to that just described, in that the upper surface thereof lies in a plane normal to the axis of the shaft 4 and is disposed for sliding contact with the under surface of the stationary support member 11 in a direction transverse said shaft axis as shown in the drawing.

Each of the flange portions 28 and 29 is urged against, and retained in contact with, the respective surfaces of the stationary support member 11, for example, by means of one or more bowed leaf springs 32 and 33, which may have their ends secured to the member 11 and flange portions 28 and 29, respectively, as the case may be. In addition, and in order to minimize sliding friction between the flange portions 28 and 29, and the stationary member 11, a small amount of a suitable lubricant may be forced between the respective contacting surfaces through a connection 34 and suitably arranged passages 35 formed in said member 11. Preferably the lubricant employed is an oil of relatively heavy consistency and, for example, may contain small amounts of rosin and Paratone.

By virtue of the foregoing construction, and as will be apparent from the drawing, the bearing assemblies 16 and 17, including their flange portions 28 and 29, are independent of each other, and the construction and arrangement thereof is such that said bearing assemblies may move in directions transverse to the shaft axis relative both to each other and to the support member 11.

It has been previously stated that the vibrating forces caused by distortion or deflection of the shaft 4 produce vibration waves of different amplitude and length depending upon the rotational speed of the device, and that severe vibration (a critical speed) will occur at the speed or speeds of rotation at which the nodes of vibration waves fall simultaneously at the centers of the two bearing assemblies 16 and 17. Accordingly, another important feature of the invention is concerned with the spacing of the two bearing assemblies 16 and 17 with respect to each other axially of the shaft 4 supported thereby. Thus, it has been discovered that vibration caused by distortion or deflection of the shaft 4 may be overcome, or dampened effectively, by spacing these bearing assemblies axially of said shaft so that their centers are separated by a distance different from the spacing of the nodes of the vibration waves and nodes of vibration waves can at no time exist simultaneously at both bearing assemblies 16 and 17.

Of course, and as hereinabove set forth, in any rotating device the speed or speeds of rotation that will be critical and cause severe vibration depend largely upon the particular device involved, the degree of stiffness of the shaft supported by the bearings and the inertia of the stationary and rotating parts of the device. Thus, for any given device, the critical speed or speeds that may occur during acceleration and deceleration to and from the desired operating speed of rotation may be determined by tests, and with this information at hand the spacing of the centers of the bearing assemblies 16 and 17, with respect to each other axially of the shaft 4, so that nodes of the vibration waves can at no time exist simultaneously at both bearings, may be determined with good accuracy and then corrected by trial and error methods.

In the operation of a bearing assembly constructed in accordance with the present invention, the top bearing assembly 6 is relatively rigid and, as the device attains a critical speed of rotation causing distortion or deflection of the shaft 4 to an extent that normally would cause vibration, the bearing flanges 28 and 29, being slidably associated with the stationary support member 11, are free to move laterally within certain limits both relative to each other and with respect to said member 11, with the result that the shaft 4 tends to seek its own axis of rotation and compensate for distortion therein, relative to the stationary support members, to such an extent that the vibration forces caused by shaft distortion are absorbed and not imparted directly to the stationary parts of the device. Furthermore, it will be apparent that by spacing the two bearing assemblies 16 and 17 so that a vibration node can at no time exist simultaneously at both bearings, any tendency toward vibration, caused by the existence of a vibration node at one of the bearing assemblies will be damped effectively by the other bearing assembly through which the vibration wave passes at a point other than at a node thereof.

From the foregoing, therefore, it will be observed that the present invention provides an effective damping device for vibration at critical speeds of rotation, wherein the support bearings are independent of, and movable relatively to each other in directions transverse the shaft axis, and the bearings are spaced apart axially of the shaft a distance such that a vibration wave node can not exist simultaneously at both bearings.

It is to be understood that apart from the independent slidable mounting and axial spacing of the bearings, the particular bearing construction forms no part of the invention, and while a particular preferred embodiment of the features of the invention have been illustrated and described herein, the invention is not to be limited to such disclosure as it is contemplated that changes and modifications may be made within the scope of the claims.

We claim:

1. In combination with a shaft supported for rotation about its longitudinal axis, means providing stationary axially spaced flat supporting surfaces normal to said shaft and freely surrounding the same, and independent bearing assemblies on said shaft spaced axially thereof a distance different from the spacing of the nodes of vibration waves at critical speeds of rotation of the shaft, a flange secured to each of said bearing assemblies each flange being disposed in sliding contact with one of said flat supporting surfaces for transverse movement relative to each other and said surfaces.

2. A vibration damping structure for rotating devices having aligned shafts at respectively opposite ends thereof, comprising a bearing support for one of said shafts, means providing axially spaced flat supporting surfaces normal to the other of said shafts and freely surrounding the same, and independent bearing assemblies on said other shaft spaced axially thereof of distance different from the spacing of the nodes of vibration waves at critical speeds of rotation of the device, a flange secured to each of said bearing assemblies each flange being disposed in sliding contact with one of said flat supporting surfaces for transverse movement relative to each other and said surfaces.

3. In combination with a shaft supported for rotation about its longitudinal axis, means providing stationary axially spaced flat supporting surfaces normal to said shaft and freely surrounding the same, independent bearing assemblies on said shaft spaced axially thereof a distance different from the spacing of the nodes of vibration waves at critical speeds of rotation of the device, a flange secured to each of said bearing assemblies each flange being disposed in sliding contact with one of said flat supporting surfaces for transverse movement relative to each other and said surfaces, and means for introducing lubricant between the slidably contacting surfaces of said bearing assemblies and said flat supporting surfaces.

4. In combination with a shaft supported for rotation about its longitudinal axis, means providing stationary axially spaced flat supporting surfaces normal to said shaft and freely surrounding the same, independent bearing assemblies on said shaft spaced axially thereof a distance different from the spacing of the nodes of vibration waves at critical speeds of rotation of the device, a flange secured to each of said bearing assemblies each flange being disposed in sliding contact with one of said flat supporting surfaces for transverse movement relative to each other and said surfaces, means biasing said bearing assemblies into contact with said surfaces, and means for introducing lubricant between the slidably contacting surfaces of said bearing assemblies and said flat supporting surfaces.

5. A vibration damping structure for rotating devices having aligned shafts at respectively opposite ends thereof, comprising a bearing support for one of said shafts, means providing axially spaced flat supporting surfaces normal to the other of said shafts and freely surrounding the same, bearing assemblies on said other shaft adjacent said supporting surfaces, said bearing assemblies being independent of each other and spaced apart axially of said other shaft a distance different from the spacing of the nodes of the vibration waves at critical speeds of rotation of the device, means slidably supporting each of said bearing assemblies with respect to one of said surfaces for movement relative to each other and said surfaces in directions transverse the shaft axis, and means biasing said last-mentioned means into contact with said flat surface portions.

6. A vibration damping structure for rotating devices having aligned shafts at respectively opposite ends thereof, comprising a bearing support for one of said shafts, a stationary member freely surrounding the other of said shafts and having axially spaced flat surface portions disposed normal to said other shaft, bearing assemblies on said other shaft adjacent said member, said bearing assemblies being independent of each other and spaced apart axially of said other shaft a distance different from the spacing of the nodes of the vibration waves at critical speeds of rotation of the device, means slidably supporting each of said bearing assemblies with respect to one of said flat surface portions of the member for movement relative to each other and said member in directions transverse the shaft axis, and means biasing said last-mentioned means into contact with said flat surface portions of the member.

7. A vibration damping device for rotating mechanisms having aligned shafts at respectively opposite ends thereof, comprising a bearing support for one of said shafts, a supporting structure providing axially spaced flat surfaces normal to the other of said shafts and freely surrounding the same, at least two bearing assemblies on said other shaft respectively adjacent said structure and spaced apart axially of the shaft a distance different from the spacing of the nodes of vibration waves at critical speeds of rotation, shock absorbing elements in said bearing assemblies operable to dampen the lesser vibrations in such mechanism, and means slidably supporting each of said bearing assemblies with respect to one of said surfaces for transverse movement relative to each other and the structure to absorb the more severe vibrations and substantially isolate the same with respect to said supporting structure.

8. A vibration damping device for rotating mechanisms having aligned shafts at respectively opposite ends thereof, comprising a bearing support for one of said shafts, a supporting structure providing axially spaced flat surfaces normal to the other of said shafts and freely surrounding the same, bearing assemblies on said other shaft respectively adjacent said structure and spaced apart axially of the shaft a distance different from the spacing of the nodes of vibration waves at critical speeds of rotation, shock absorbing elements in said bearing assemblies operable to dampen the lesser vibrations in such mechanism, and means slidably supporting each of said bearing assemblies with respect to one of said flat surfaces for transverse movement relative to each other and said structure to absorb the more severe vibrations and substantially isolate the same from transmission to said supporting structure.

9. A vibration damping device for rotating mechanisms having aligned shafts at respectively opposite ends thereof, comprising a bearing support for one of said shafts, a supporting structure providing axially spaced flat surfaces normal to the other of said shafts and freely surrounding the same, at least two bearing assemblies on said other shaft adjacent said structure and spaced apart axially a distance different from the spacing of the nodes of vibration waves at critical speeds of rotation, shock absorbing elements in said bearing assemblies operable to dampen the lesser vibrations in such mechanism, means slidably supporting each of said bearing assemblies with respect to one of said flat surfaces for transverse movement relative to each other and the structure to absorb the more severe vibrations and substantially isolate the same from transmission to said supporting structure, and means biasing said last-mentioned means into contact with said flat surfaces.

10. A vibration damping device for rotating mechanisms having aligned shafts at respectively opposite ends thereof, comprising a bearing support for one of said shafts, a supporting structure providing axially spaced flat surfaces normal to the other of said shafts and freely surrounding the same, bearing assemblies on said other shaft respectively adjacent the structure and spaced apart axially a distance different from the spacing of the nodes of vibration waves at critical speeds of rotation, shock absorbing elements in said bearing assemblies operable to dampen the lesser vibrations in such mechanism, means slidably supporting each of said bearing assemblies with respect to one of said flat surfaces for transverse movement relative to each other and the structure to absorb the more severe vibrations and substantially isolate the same from transmission to said supporting structure, and means biasing said last-mentioned means into contact with said flat surfaces.

11. A vibration damping structure for rotating devices having aligned shafts at respectively opposite ends thereof, comprising a bearing support for one of said shafts, means providing axially spaced flat supporting surfaces normal to the other of said shafts and freely surrounding the same, bearing assemblies on said other shaft adjacent said supporting surfaces, said bearing assemblies being independent of each other and spaced axially of said other shaft a distance different from the spacing of the nodes of the vibration waves at critical speeds of rotation of the device, means slidably supporting each of said bearing assemblies with respect to one of said surfaces for transverse movement relative to each other and said surfaces, and means for introducing a lubricant intermediate the contacting surfaces of said last-mentioned means and the flat supporting surfaces.

12. A vibration damping structure for rotating devices having aligned shafts at respectively opposite ends thereof, comprising a bearing support for one of said shafts, a stationary annular member freely surrounding the other of said shafts and having axially spaced flat surface portions disposed normal to said other shaft, bearing assemblies on said other shaft adjacent said member, said bearing assemblies being independent of each other and spaced apart axially of said other shaft a distance different from the spacing of the nodes of the vibration waves at critical speeds of rotation of the device, means slidably supporting each of said bearing assemblies with respect to one of the adjacent flat surface portions of said member for transverse movement relative to each other and said member, and means for introducing a lubricant intermediate the contacting surfaces of said last mentioned means and the flat surface portions of the member.

13. A vibration damping structure for rotating devices having aligned shafts at respectively opposite ends thereof, comprising a relatively rigid bearing support for one of said shafts, means providing axially spaced flat supporting surfaces normal to the other of said shafts and freely surrounding the same, bearing assemblies on said other shaft adjacent said supporting surfaces, said bearing assemblies being independent of each other and spaced apart axially of said other shaft a distance different from the spacing of the nodes of the vibration waves at critical speds of rotation of the device, flanges slidably supporting each of said bearing assemblies with respect to one of said surfaces for transverse movement relative to each other and said surfaces, resilient means biasing said flanges into contact with said surface portions of the member, and means for introducing a lubricant intermediate the contacting surfaces of said flanges and flat supporting surfaces.

14. A vibration damping structure for rotating devices having aligned shafts at respectively opposite ends thereof, comprising a relatively rigid bearing support for one of said shafts, a stationary annular member freely surrounding the other of said shafts and having axially spaced flat surface portions disposed normal to said other shaft, bearing assemblies on said other shaft adjacent said member, said bearing assemblies being independent of each other and spaced apart axially of said other shaft a distance different from the spacing of the nodes of the vibration waves at critical speeds of rotation of the device, flanges slidably supporting each of said bearing assemblies with respect to one of the flat surface portions of said member for transverse movement relative to each other and said member, means biasing said flanges into contact with said surface portions of the member, and means for introducing a lubricant intermediate the contacting surfaces of said flanges and flat supporting surfaces.

15. A vibration damping device for rotating mechanisms having aligned vertical shafts at respectively opposite ends thereof, comprising a relatively rigid bearing support for one of said shafts, a supporting structure providing axially spaced flat surfaces normal to the other of said shaft and freely surrounding the same, at least two bearing assemblies on said other shaft respectively adjacent said flat surfaces and spaced apart axially a distance different from the spacing of the nodes of vibration waves at critical speeds of rotation, shock absorbing elements in said bearing assemblies operable to dampen the lesser vibrations in such mechanism, flanges slidably supporting each of said bearing assemblies for transverse movement relative to each other with respect to one of said flat surfaces to absorb the more severe vibrations and substantially isolate the same from transmission to said supporting structure, and means for introducing a lubricant intermediate the contacting surfaces of said flanges and flat supporting surfaces.

16. A vibration damping device for rotating mechanisms having aligned vertical shafts at respectively opposite ends thereof, comprising a relatively rigid bearing support for one of said shafts, a supporting structure providing axially spaced flat surfaces normal to the other of said shafts and freely surrounding the same, at least two bearing assemblies on said other shaft respectively adjacent said flat surfaces and spaced apart axially a distance different from the spacing of the nodes of vibration waves at critical speeds of rotation, shock absorbing elements in said bearing assemblies operable to dampen the lesser vibrations in such mechanism, means slidably supporting each of said bearing assemblies for transverse movement relative to each other with respect to one of said flat surfaces to absorb the more severe vibrations and substantially isolate the same from transmission to said supporting structure, means biasing said flanges into contact with said surface portions, and means for introducing a lubricant intermediate the contacting surfaces of said flanges and flat supporting surfaces.

17. A vibration damping device for rotating mechanisms having aligned vertical shafts at respectively opposite ends thereof, comprising a relatively rigid bearing support for one of said shafts, a supporting structure providing axially spaced flat surfaces normal to the other of said shafts and freely surrounding the same, bearing assemblies on said other shaft respectively adjacent said structure and spaced apart axially a distance different from the spacing of the nodes of vibration waves at critical speeds of rotation, shock absorbing elements in said bearing assemblies operable to dampen the lesser vibrations in such mechanism, flanges slidably supporting each of said bearing assemblies for transverse movement relative to each other with respect to one of said flat surfaces to absorb the more severe vibrations and substantially isolate the same from transmission to said supporting structure, means biasing said flanges into contact with said surface portions, and means for introducing a lubricant intermediate the contacting surfaces of said flanges and flat supporting surfaces.

References Cited in the file of this patent

UNITED STATES PATENTS

| 2,012,997 | Junkers | Sept. 3, 1935 |
| 2,138,531 | Wise | Nov. 29, 1938 |
| 2,219,875 | Roberts | Oct. 29, 1940 |
| 2,220,524 | Kapitza | Nov. 5, 1940 |
| 2,228,632 | Landis | Jan. 14, 1941 |